March 8, 1932. A. BOYNTON 1,848,307
CASING HEAD
Filed Dec. 2, 1927
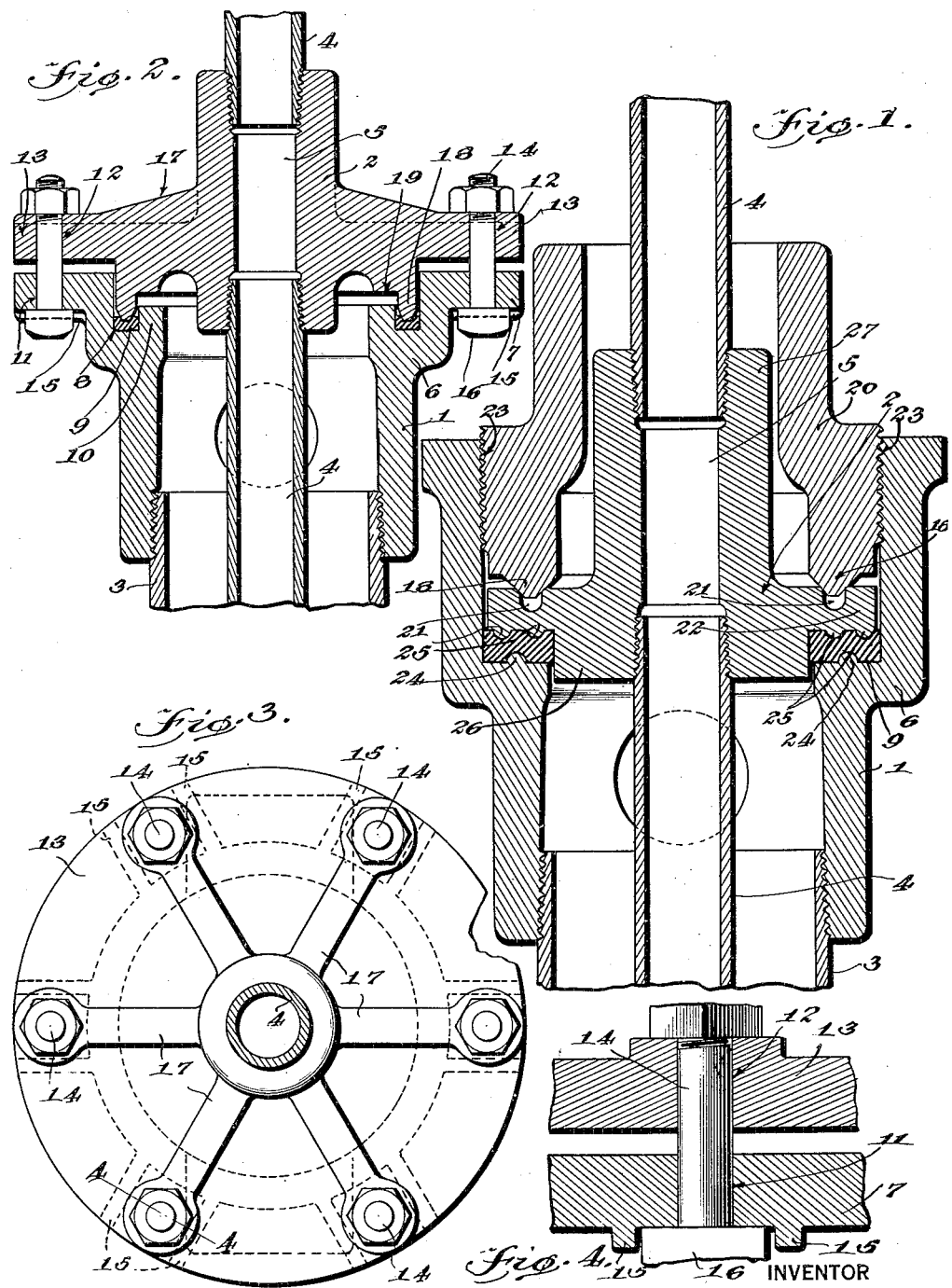
INVENTOR
Alexander Boynton,
BY
ATTORNEY Patented Mar. 8, 1932

1,848,307

UNITED STATES PATENT OFFICE

ALEXANDER BOYNTON, OF SAN ANTONIO, TEXAS

CASING HEAD

Application filed December 2, 1927. Serial No. 237,225.

This invention relates to improvements in oil well equipment, pertaining especially to casing heads, and it consists of the constructions, mode of operation and advantages herein described and claimed.

An object of the invention is to provide a relatively simple, yet sturdy and durable casing head, designed not only for the proper suspension of the tubing string from the top of the casing but primarily to prevent the leakage of internal fluid pressure by which the type of well herein proposed is rendered operative.

Other objects and advantages appear in the following specification, reference being had to the accompanying drawings, in which;

Figure 1 is a longitudinal section of a preferred type of casing head,

Fig. 2 is a longitudinal section of a modified construction,

Fig. 3 is a detail plan view of the latter,

Fig. 4 is a detail cross section taken on the line 4—4 of Fig. 3.

The patent applications in the present series are concerned with mechanical provision for the sealing of oil well casing heads in such a manner that any insipient leakage of fluid may be checked promptly, and, moreover, may initially be rendered impossible by a proper utilization of the contrivances afforded. This application has to do largely with the function of an annularly grooved ring the grooves of which are pressed into by annular projections of a contacting member making a fluid-tight joint.

In Fig. 1, the casing head comprises the main body 1 upon which the tubing carrier 2 has bearing. The main body is attached to the well casing 3, usually by means of screw threads, while the carrier 2 has adjoining sections of the tubing string 4 screwed into the extremities of the axial bore 5 as plainly illustrated. The main body 1 has a second or enlarged portion 6 which may be identified as a hub.

An annular wedge-shaped ring 18 is made to bear upon the tubing carrier 2, the ring being part of what is known as a jamb nut 20. The ring 18 engages the edges of an annular recess 21 in the flange 22 of the tubing carrier. The contacting edges of the recess 21 may be ground in to produce a double seal-off, thereby supplementing the seal-off provided by the gasket 9. The annular recess 21, may, in practice, be filled with oil or grease, thus lubricating the contacting surfaces of the carrier 2 and jamb nut 20 and preventing all tendency of the carrier 2 to turn around the gasket 9 as the jamb nut 20 is screwed down.

In connection with the latter statement, it is observed that the hub 6 of the main body 1 carries the integral enlarged portion of the main body into which the jamb nut 20 is screwed by means of the threads 23. The jamb nut bears down upon the carrier 2 and provides the desired tight joint at the gasket 9. The latter is distinctly expanded upon this operation by virtue of the confronting annular tongues or imprinting means 24 and 25 which are in staggered relationship on the confronting surfaces of the hub 6 and flange 22 respectively. These tongues cause a lateral expansion of the gasket or packing material until the edges tightly contact the inside of the enlarged wall of the main body as well as the central projection 26 of the tubing carrier.

An upward projection 27 of the tubing carrier 2 serves a very important function. It has been stated that the adjoining sections of the tubing string 4 are screwed into the tubing carrier. An appropriate wrench or chain tong may be applied to the projection 27 in order to hold the suspended tubing string while the upper and exposed section or nipple is being screwed in or broken out. There is another apparent advantage of the arrangement disclosed in Fig. 1.

Old types of oil well casing heads all permit the tubing to be pulled from the well without unscrewing more than one member of the casing head. This established practice has led to many accidents in the oil fields where casing heads have been used which require more than one member to be unscrewed before the tubing may be pulled. Crews accustomed to operating on casing heads of the first character when transferred to casing heads of the second character have been known to cause a wrecking of the apparatus by contenting themselves with unscrewing one member only. The ensuing attempt to pull the well tubing has resulted in total wrecking of the parts and frequent dropping of the tubing string.

Reverting now to the structure in Fig. 1, it is apparent that the mere unscrewing of the jamb nut 20 from the main body 1 will render the carrier 2 and suspended tubing absolutely safe and ready for pulling from the casing. The thing desired to be emphasized is that only one part is required to be unscrewed before the well tubing can be pulled. This feature may ordinarily appear of minor importance to the casual observer, but to those acquainted with the exigencies of oil well operation, the importance of this feature cannot be emphasized too strongly.

Fig. 2 illustrates a simplification of the structure in Fig. 1. The main body 1, tubing carrier 2, casing 3, and well tubing 4, are identified at once. The hub 6 is now provided with a circular flange 7.

A circular recess 8 in the tub not only provides a receptacle for the gasket 9, but defines an upstanding circular wall 10. The flange 7 has holes 11 registering with corresponding holes 12 in the flange 13 of the carrier 2, the registering holes receiving bolts 14. The flange 7 is provided with ribs 15 on the under side intended to receive the square heads 16 of the bolts and prevent the bolts from turning when the nuts are screwed in place.

As shown in Fig. 3, the flange 13 is reinforced by means of webs 17 which terminate in circular bosses around the holes 12. The screwing down of the nuts upon the bolts will necessarily set up such stresses in the flange 13 which are amply compensated for by the reinforcing provision.

The formation of the carrier 2 is such as to provide an annular wedge-shaped ring 18 similar in function to the ring 18 described in connection with Fig. 1. The thickness of the ring is less than the width of the circular recess 8 into which it is introduced and bears upon the gasket 9. The gasket, it may be stated, is composed of a deformable material, for example, lead, fiber, or the like. There is ample room between the upper edge of the circular wall 10 and the adjacent butting base 19 of the ring 18 so that considerable adjustment may be effected before the adjacent metallic parts come into contact. This principle also prevails in the case of the adjoining flanges 7 and 13.

I claim:—

1. A casing head comprising a main body, a gasket resting thereupon, a tubing carrier supported upon the gasket and having an annular recess, and a jamb nut screwed upon the main body having a wedge-shaped ring portion directed into the recess and engaging with the edges thereof.

2. A casing head comprising a main body, a jamb nut screwed upon the main body, a ring portion outstanding from the jamb nut, and a tubing carrier supported by the main body, having an annular recess in which the outstanding portion bears when turning the jamb to clamp the tubing carrier, said recess being adapted to be filled with a lubricant to prevent consonant turning of the carrier.

3. A casing head comprising a main body, a gasket fitted thereupon, a jamb nut screwed upon the main body, a wedge-shaped ring on the jamb nut, and a tubing carrier resting upon the gasket, having an annular recess with the edges of which said ring engages to produce a seal-off supplemental to the gasket, said recess being adapted to be filled with a lubricant to prevent turning of the carrier upon the gasket when the jamb nut is screwed down.

Signed at San Antonio, in the county of Bexan and State of Texas, this 22 day of Oct., A. D. 1927.

ALEXANDER BOYNTON.